(12) United States Patent
Seidman et al.

(10) Patent No.: US 7,587,340 B2
(45) Date of Patent: Sep. 8, 2009

(54) METHOD AND APPARATUS FOR SELLING WITH SHORT-BIDDING ON GOODS

(76) Inventors: Glenn R. Seidman, 830 W. California Way, Wood Side, CA (US) 94062; Shawn Perleschi, 229 Arroz Pl., Fremont, CA (US) 94536

( * ) Notice: Subject to any disclaimer, the term of this patent is extended or adjusted under 35 U.S.C. 154(b) by 699 days.

(21) Appl. No.: 10/757,432

(22) Filed: Jan. 15, 2004

(65) Prior Publication Data
US 2005/0160026 A1 Jul. 21, 2005

(51) Int. Cl.
*G06Q 30/00* (2006.01)
(52) U.S. Cl. .......................... 705/26; 705/37
(58) Field of Classification Search .............. 705/26
See application file for complete search history.

(56) References Cited

U.S. PATENT DOCUMENTS

| | | | | |
|---|---|---|---|---|
| 7,130,815 B1* | 10/2006 | Gupta | ........................ | 705/26 |
| 2002/0038282 A1* | 3/2002 | Montgomery | ................ | 705/37 |
| 2002/0147675 A1* | 10/2002 | Das et al. | ...................... | 705/37 |
| 2004/0024682 A1* | 2/2004 | Popovitch | .................... | 705/37 |
| 2005/0131809 A1* | 6/2005 | Watt et al. | ..................... | 705/39 |

OTHER PUBLICATIONS

Quantitative analysis for Internet-enabled supply chains, Interfaces, Pinar Keskinocak, Sridhar Tayur. Interfaces. Linthicum: Mar./Apr. 2001. vol. 31, Iss. 2; p. 70, downloaded from ProQuest Direct on the Internet on Jun. 8, 2009, 20 pages.*

* cited by examiner

*Primary Examiner*—James Zurita

(57) ABSTRACT

A method and software apparatus for a short-bidding auction manager is disclosed. One embodiment allows potential buyers to submit short-bids, so named because they fall short of an auction seller's asking price, and collects the short-bids on behalf of the auction seller. Additionally, a buyer may submit a bid that is higher or lower than previous bids. While short-bids are below what is considered acceptable, such bids may be reviewed and individually accepted by the seller, but the highest short-bid is considered the best short-bid offered since the seller intends to realize the most money from the sale. Meanwhile, one embodiment waits for auction completion and automatically consummates transactions for the highest above asking price bid or bids but at any point in time during the auction, short-bids and/or acceptable bids so far may be consummated before the auction ends.

14 Claims, 7 Drawing Sheets

METHOD AND APPARATUS FOR SELLING WITH SHORT-BIDDING ON GOODS

TECHNICAL FIELD OF THE INVENTION

The present invention pertains to electronic auction environments for sellers of a good for sale where purchasers bid on the good in attempts to buy the posted good. In particular, the present invention pertains to software apparatuses that track all bids for a seller of a good so that the seller can know at any point in time during the sale of a good, the price or prices that buyers are willing to pay for the item even when they are not willing to pay the posted price. All of this takes place during a live auction. When a bid is less than the price posted, this is known as a "Short-Bid". Such software apparatuses are embodied as a Short-Bidding Auction Manager and associated software subsystems and files associated therewith.

BACKGROUND OF THE INVENTION

Electronic Auctions have become commonplace with the many Auction portals deployed on the Web. Many Auction portals such as eBay, Yahoo, or uBid provide auction models for assisting sellers of large supplies of an item. eBay, for example, offers a "Dutch" Auction wherein the top N bidders will win the N quantity of a good for sale at auction.

A well-known drawback of common auction selling, in particular large or infinite supply selling is that often not all of a supply is sold. This often leaves the seller with inventory that he does not want. Meanwhile, many purchasers may have come to the auction posting and not bothered to bid because the starting bid price was a little or a lot too high for them. However, many potential purchasers would have bid if the price were even just a small amount less. The seller has no way of knowing that he could have sold more inventory if the price was lowered only a little.

The failure to sell inventory is even more interesting when the good being sold may be easily copied and/or downloaded an infinite number of times electronically. In this infinite supply case, the flexibility to drop the price on the good is much greater since copying bits is all that needs to be performed. The seller would definitely like to know what lower prices purchasers were willing to pay and make an intelligent decision on whether or not to let more copies be purchased and downloaded. While the profit on each additional copy sold is the price offered, the seller must balance this lowered price with the fact that word will spread that the electronic good was obtainable at the lowered prices. Similar decision processes are available to the large supplier of real goods as well. However, the decision and the timing of it is up to the seller. Current auction software apparatuses do not provide the means to determine what lower bidders would have been willing to pay. As a result, the seller has to guess what minimum price to set on a new auction, without any useful potential buyer information, in order to dump the rest of their inventory.

In light of the above, there is a need for methods and apparatus in an auction selling environment for the means to determine what purchasers would pay for a good even when they do not agree to the current minimum price. This will provide a greater opportunity for sellers to dispose of more inventory and allow them to decide on exactly which specific lower prices make sense for the seller.

SUMMARY OF THE INVENTION

Embodiments of the present invention advantageously satisfy the above-identified need in the art. In particular, one embodiment of the present invention recognizes that in order to determine what buyers are willing to pay for a good, the present invention must provide the means for buyers to enter bids no matter how low the bid is. The present invention provides the seller methods and apparatus to review and analyze current bids in order to determine if it makes sense for the seller to execute a transaction at a specific lower price.

Specifically, one embodiment of the present invention is a Short-Bidding Auction Manager that collects all potential purchaser "short-bids" on a good for sale at auction and provides the seller the ability to review and analyze some or all bids, the Short-Bidding Auction Manager comprising: (a) a User Account Manager and associated User Manager user interface that provides the means for buyer and sellers to join an auction website and establish pertinent personal information, wherein joining causes a user account to be created and stored in a User Accounts table (in Auction Database) with a unique user ID, and the user IDs are employed by users when buying and selling; (b) an Auction Creator with User Interface for sellers that allows sellers to post information about a good as well as set the quantity and the asking price for the good; (c) an Auction Item Manager that stores the properties of an auction in a database when it is created; (d) a Bid Creator with User Interface for buyers that allows buyers to set a price for a bid on an item which may be at the asking price or be a short-bid which is less than the asking price and which becomes a contract to buy once submitted; (e) a Bid Reviewer User Interface for sellers that provides the list of short-bid contracts for the seller to review; (f) a Bid Manager that executes a sale if a bid is at the asking price posted for a good, while it collects and tracks all short-bids as bid contracts no matter how low the price bid is; (g) a Sale Executor that executes a sale between buyer and seller when a bid is placed at the asking price or when the seller decides to accept a short-bid, wherein executing a sale comprises notification to buyer and seller that the buyer's submittal of a contract to buy must be executed; (h) an Email Notifier that sends emails to sellers and buyers constituting the notifications generated; (i) an Auction Database that stores the User Accounts, current Auction items, current Bids, Auction History, and Bid History.

DETAILED DESCRIPTION

In accordance with one embodiment of the present invention, a Short-Bidding Auction Manager 100 enables sellers to know what potential buyers will pay for a good, real or electronic, and subsequently and immediately execute on that knowledge if and when desired. In accordance with one or more embodiments of the present invention, the advantageously obtained knowledge is realized by providing the means to make each bid contractual and by providing the means to collect and track each bid so that some or all may be executed on at the seller's discretion.

Figure 1:
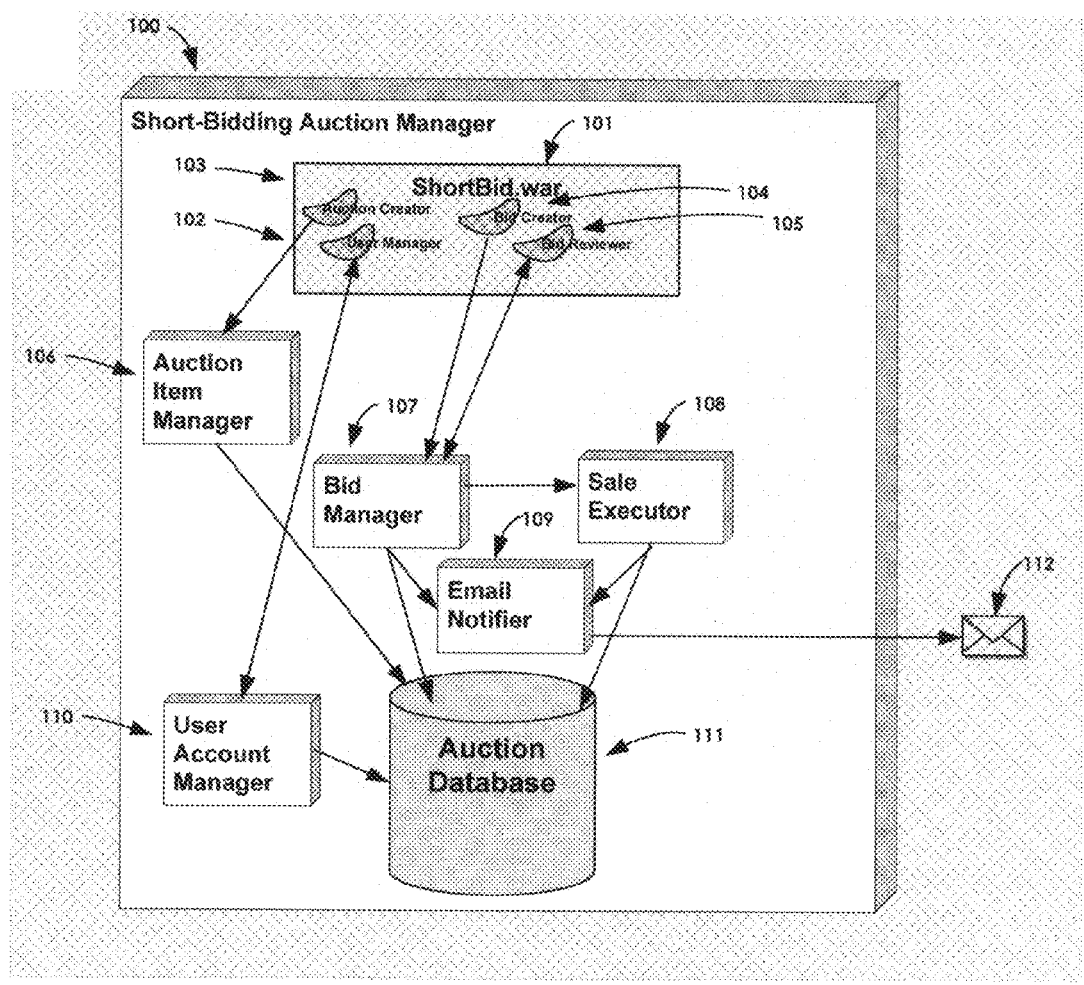
FIG. 1 shows the Short-Bidding Auction Manager with internal subsystems and dataflow depicted.
Figure 4:
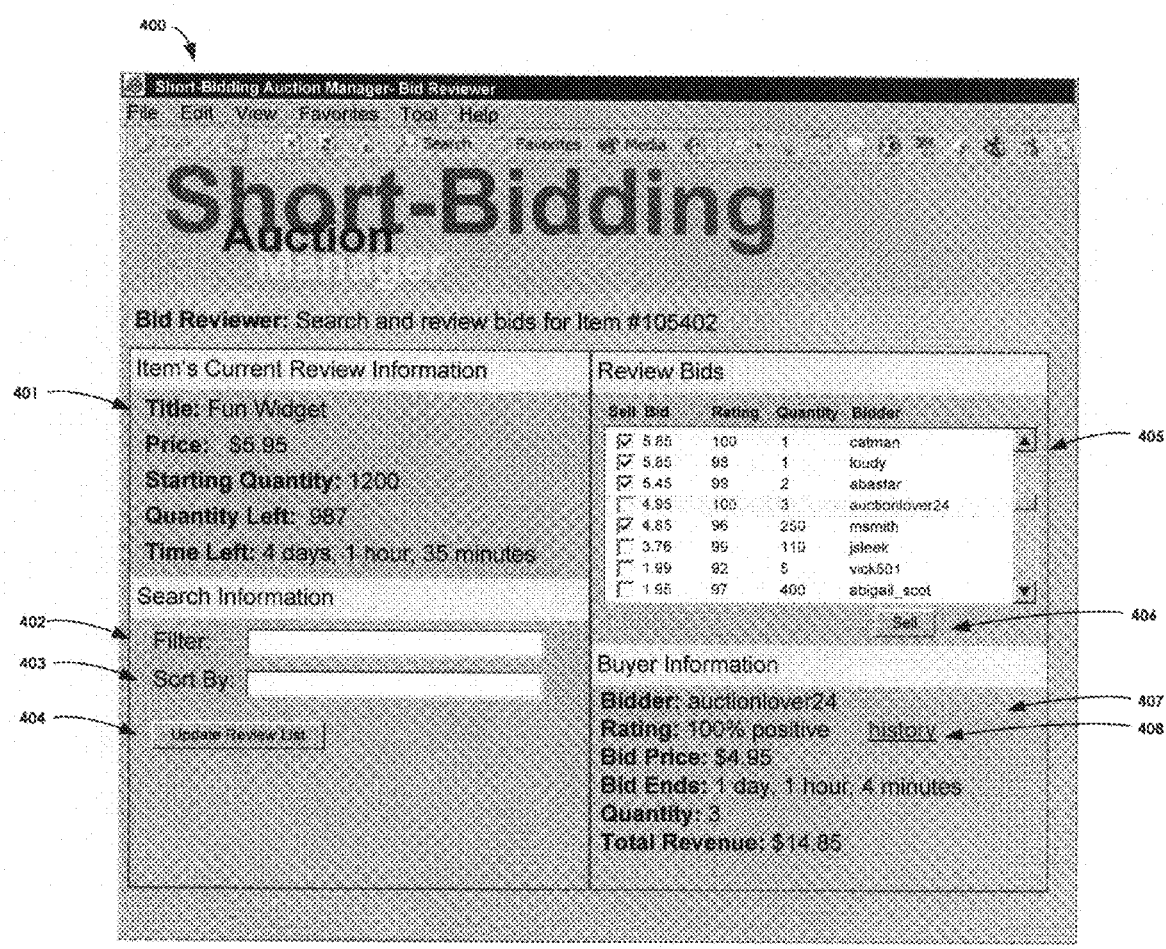
FIG. 4 shows the Bid Reviewer user interface screen.
Figure 5:
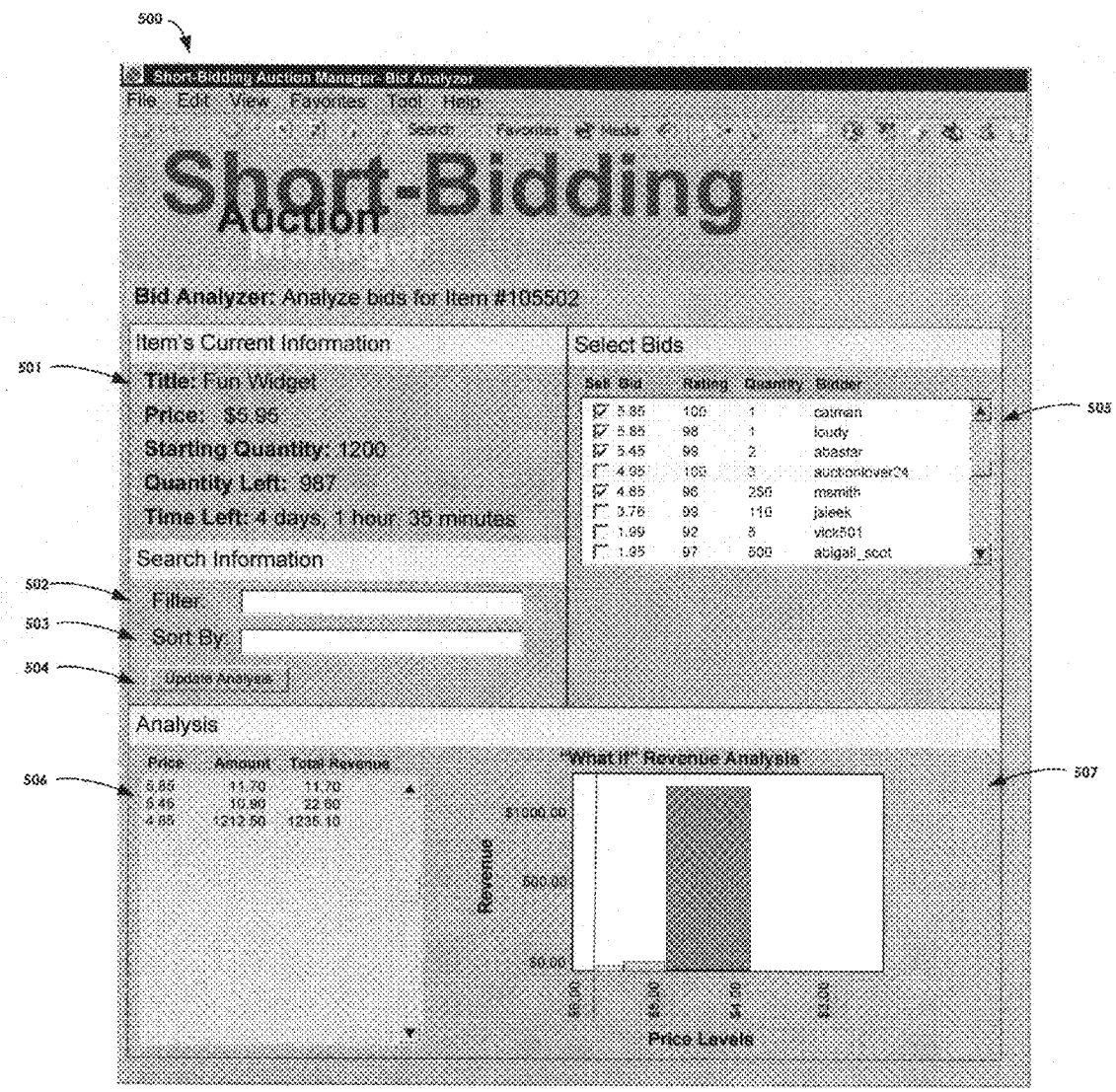
FIG. 5 shows the Bid Analyzer user interface screen.
Figure 6:
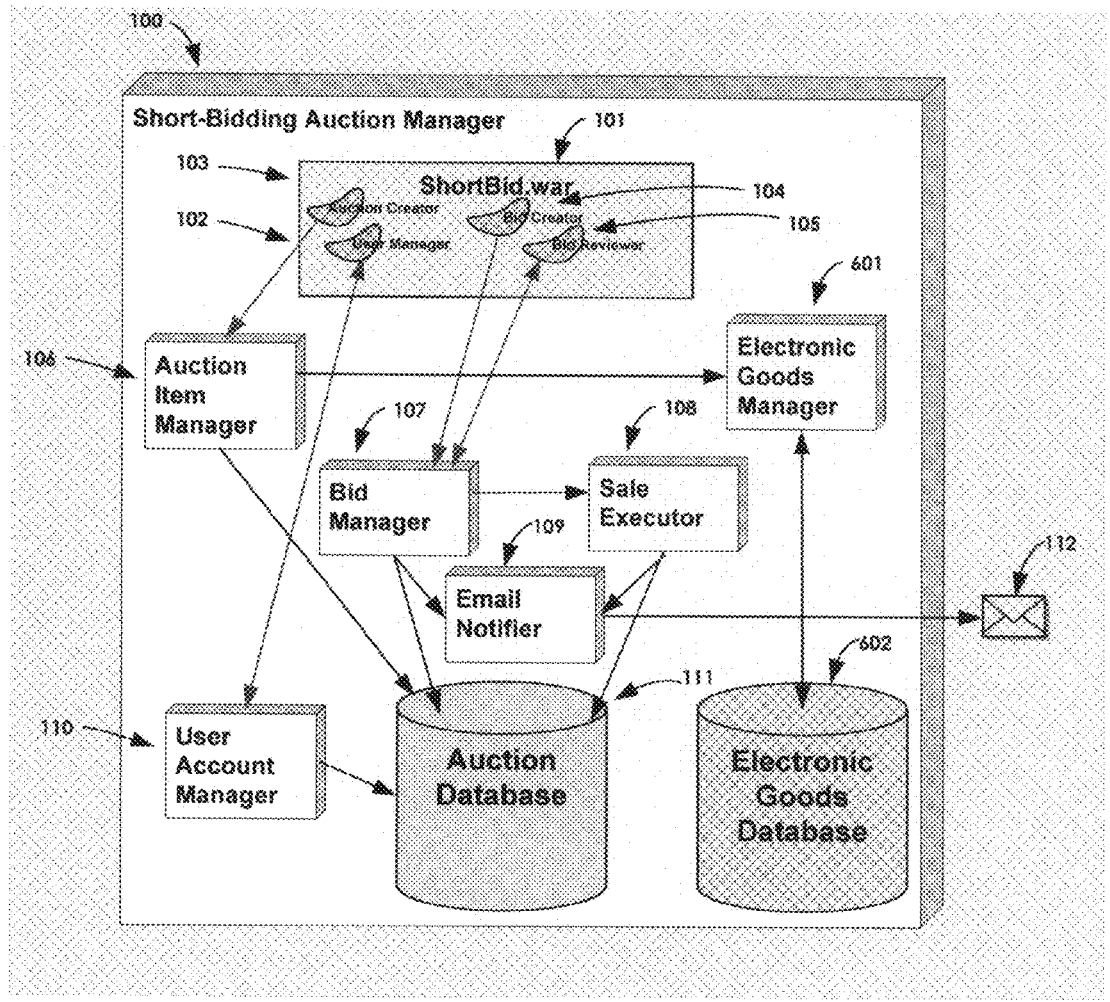
FIG. 6 shows the Short-Bidding Auction Manager with additional internal subsystems that may be present in some embodiments of the invention.
Figure 7:
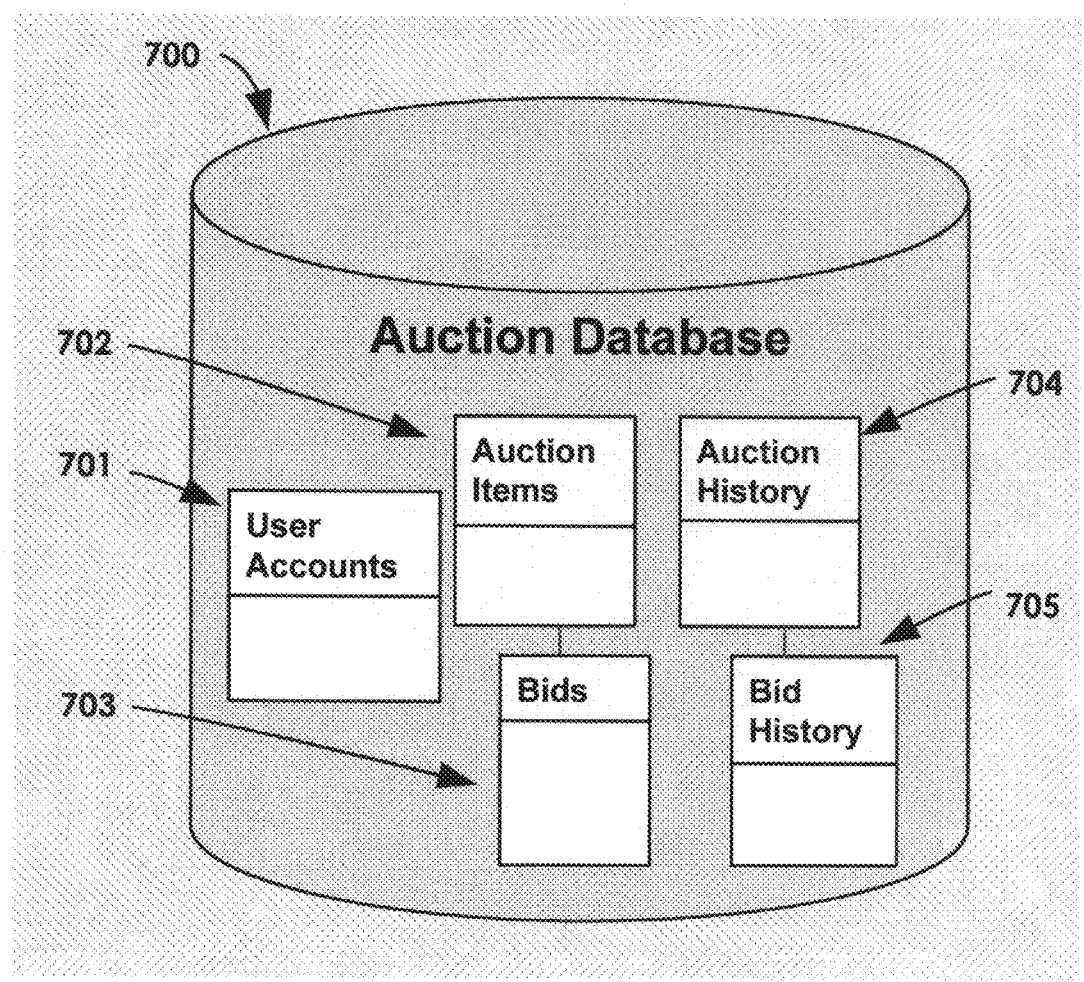
FIG. 7 shows the tables required to store auction and bid information.

The following detailed description of embodiments of the present invention employs the diagrams in FIG. 1 through FIG. 7. A typical embodiment of the present invention will comprise core internal subsystems shown in FIG. 1. Embodiments may employ any or all of, derivations of, or similar user interface screens (200 - 500) pictured in FIG. 2 through FIG. 5. Embodiments of the present invention employ some or all of the internal subsystems and database tables 700 that are illustrated in FIG. 1, FIG. 6, and FIG. 7.

A Short-Bidding Auction Manager 100 fabricated in accordance with the present invention must have methods and apparatus for presenting interactive user interface screens. FIG. 1 and FIG. 6 depict a classic web application architecture where all the user interface screens are implemented as Java Servlets (102 - 105) (each group of user interface Servlets are depicted in the shape of a bean to represent "JavaBeans") that are deployed in a Web ARchive or WAR file 101. These Java Servlet implementations (102 - 105) of user interface screens will render as web pages when users employ Web Browsers to access the Short-Bidding Auction Manager Web Server. Web application deployment and user interface screen implementation using Java Servlets are well-known by those skilled in the art. However, various embodiments may choose to deploy subsystems and user interface screens without web architectures. A web architecture is shown only for illustrative purposes.

A Short-Bidding Auction Manager fabricated in accordance with the present invention must have methods and apparatus for user account management. The user account manager 110 comprises a collection of user interfaces for registering as a new user, logging in, and editing one's user account details. One embodiment captures a human readable User ID that will identify each user as unique. These User IDs are the monikers employed to identify buyers and sellers in auctions. Most embodiments will also maintain name information and an email address. More elaborate embodiments may include mailing address and phone numbers. Embodiments that manage payments immediately will also take banking and/or credit card information. While FIG. 7 depicts a table for storing user accounts 701, user interface screens and a more detailed discussion of the user account infrastructure is not included here since methods and apparatus for user account management is well-known by those skilled in the art.

Figure 2:
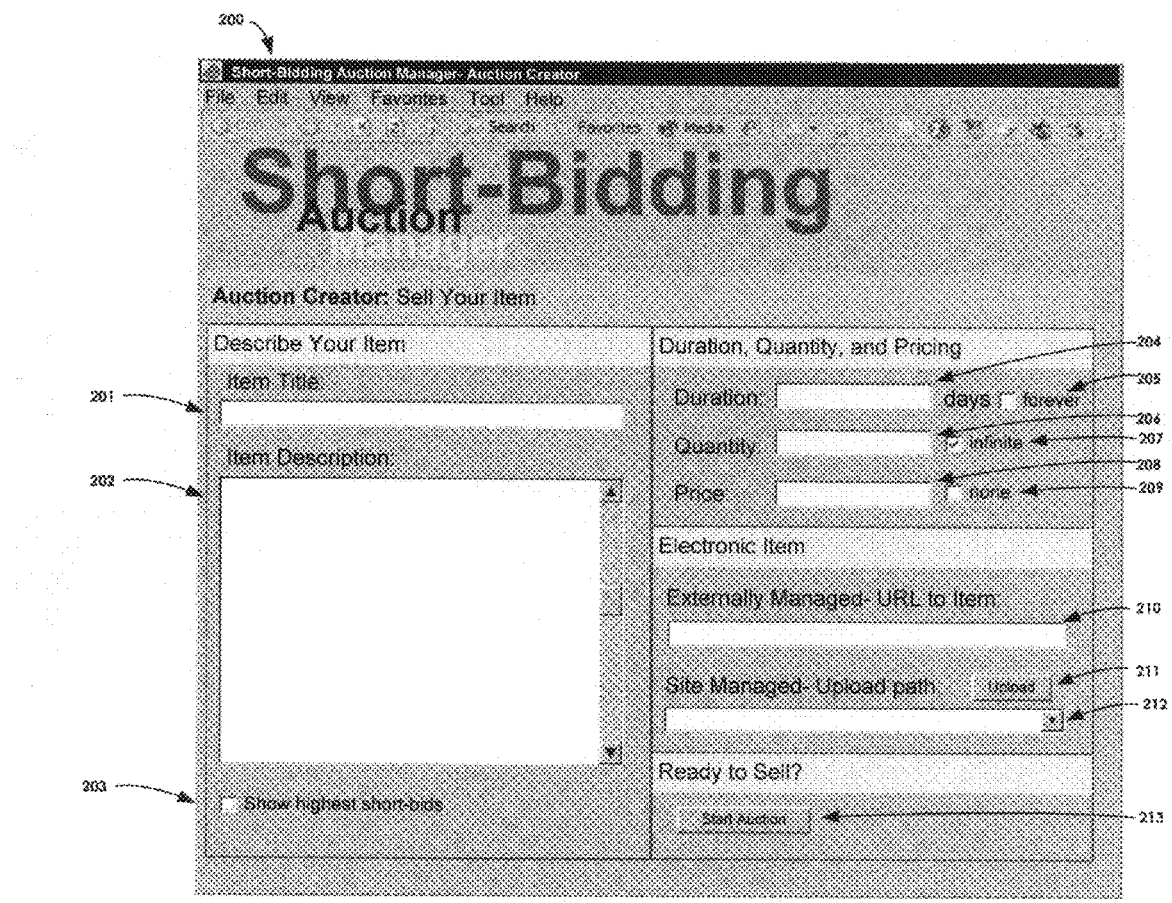
FIG. 2 shows the Auction Creator user interface screen.

A Short-Bidding Auction Manager fabricated in accordance with the present invention provides sellers the ability to create new auctions for items using a user interface screen 200 like the one pictured in FIG. 2. One embodiment of the present invention employs this simple user interface screen. This user interface screen is basic and is largely composed of the typical screen components (201, 202, 204, 206, 208) found in auction creators that are familiar to those skilled in the art of auction software. More sophisticated embodiments may provide an ability to incorporate enhancements for an auction item posting during auction creation. Such enhancements might include the ability to add pictures or videos, HTML text, categorization and sub-categorization to assist buyer searches, and other enhancements familiar to those skilled in the art of auction posting.

The most notable screen components (FIG. 2) of this embodiment are the three checkboxes "forever" for duration, "infinite" for quantity, and "none" for price (205, 207, 209). Unlike typical auctions, auctions in the present invention can have a duration that lasts forever with a posted price but where short-bids are collected and potentially honored by the seller at any point in time during an indefinitely long period of time. The "infinite" quantity checkbox is employed for electronically downloadable goods where any number of purchases and subsequent downloads may take place. The "none" checkbox for price allows sellers to not have to post a price at all. In this case, all bids are considered short-bids such that all bids are subject to the acceptance of the seller.

One embodiment of the present invention provides a "show highest short-bids" checkbox 203, as shown in the bottom left of FIG. 2. This checkbox provides the seller a means for allowing bidders to see the highest short-bids that are currently not accepted. This can motivate potential purchasers to bid higher prices even though they plan to enter a short-bid. Embodiments may also choose to control whether or not the quantity requested of the highest short-bids is also to be displayed, or implement to always or never display quantity information.

Most embodiments of the present invention will employ a derivative of the Auction Creator user interface screen to represent a very similar Auction Editor user interface screen. Such a screen will allow the seller to modify any or all auction details for an item. The posted auction item price may even be increased or decreased. Note that a decrease should cause embodiments of the present invention to execute sales transactions for any short-bids that are at the new lesser price.

One embodiment of the present invention provides methods and apparatus for deleting or terminating an auction.

One embodiment of the present invention provides methods and apparatus for recording any or all salient events about an auction such as when it was created, when it ended, bid statistics, sales statistics, when it was modified and what was modified. Such embodiments include user interface screens for reviewing auction history (704 and 705).

One embodiment of the present invention has an Auction Item Manager 106 like the one pictured in FIG. 1 that stores all of the information entered for an Auction Item during Auction Creation. The Auction Item Manager 106 inserts the new Auction for the Item in the "Auction Items" table when the "Start Auction" pushbutton 213 is depressed on the Auction Creator user interface screen of FIG. 1. The Auction Item is given a unique Auction ID which the auction item row of information is keyed on in the table.

One embodiment of the present invention will have an Email Notifier 112 like the one pictured in FIG. 1 that sends emails to auction users upon salient events that they need to be aware of.

Figure 3:
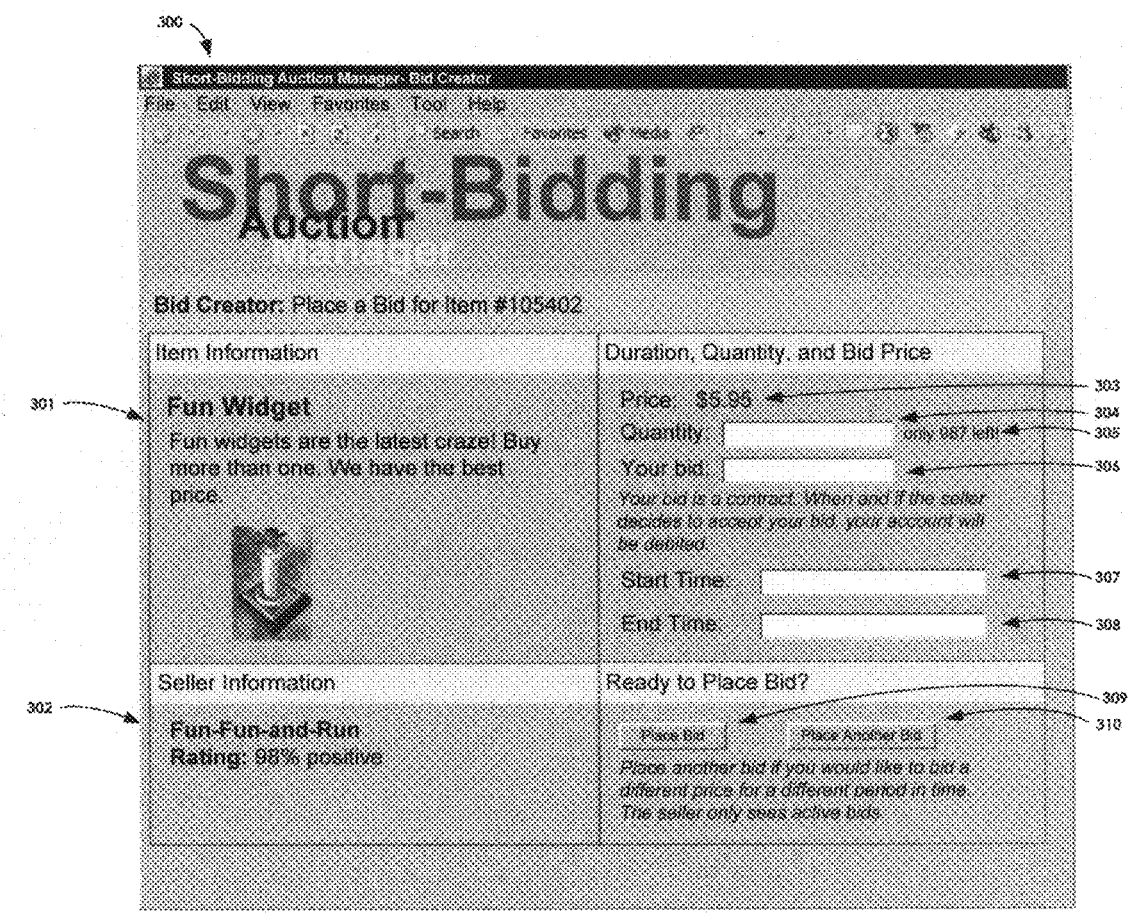
FIG. 3 shows the Bid Creator user interface screen.

One embodiment of the present invention employs a Bid Creator user interface screen 300 like the one depicted in FIG. 3. Here the buyer enters a bid 306 and a quantity 304 for the item auction item 301 desired. While FIG. 3 depicts a start 307 and end time 308 for the bid 309, the ability to enter a time interval may not be available in simpler embodiments of the present invention. FIG. 3 also shows a "Place Another Bid" pushbutton 310 which would allow embodiments with such a pushbutton to offer buyers a means for entering multiple bids where the bid changes depending on the time interval. Such embodiments recognize four distinct categories of bids: active bids (short-bids which are eligible for acceptance during their specified time interval), inactive expired bids (short-bids which were active but which are past their end time), inactive future bids (bids which will be active when the time reaches their start time), and successful bids (bids which have been accepted and have executed the corresponding sales transaction).

One embodiment of the present invention hides the time intervals and future bid adjustments from the seller of the auction item. Other embodiments may desire to provide this information to the seller or have a checkbox that allows it to be the buyer's decision. Those skilled in the art may employ other variations.

When a new bid is placed with the "Place Bid" pushbutton 309, one embodiment of the present invention invokes a Bid Manager 107 as shown in FIG. 1 to first check to see if the bid is equal to the price posted for the auction item. If it is, the Bid manager 107 recognizes that a sale must be executed immediately; otherwise the Bid Manager 107 collects the Bid by inserting it into a Bid record into the "Bids" table 703. One of the columns of this table consists of the Auction ID. This allows a JOIN operation to return a view of all of an Auction item's bids. Another column denotes the "Active Status" providing the means to filter out inactive bids that haven't become active yet.

One embodiment of the present invention stores each short-bid in a Bids Table 703 where each Bid record maintains an Auction ID column in order to view which specific bids belong to which specific auction.

One embodiment of the present invention provides methods and apparatus for recording every bid and writing them to the "Bid History" table 705 wherein one column of each written Bid History record contains the Auction ID it belongs to. Such embodiments also include user interface screens for reviewing bid history.

One embodiment of the present invention provides methods and apparatus for recording every sale executed in the "Bid History" Table 705. Such embodiments also include user interface screens for reviewing sales history.

One embodiment of the present invention employs a Sale Executor 108 as shown in FIG. 1 to execute a sale. Sale execution may follow the eBay model of notifying both the buyer and seller that the sale must now be contractually executed and that buyer must pay seller external to the auction website. Other embodiments may manage payment within the auction site by collecting payment from the buyer's credit card, bank account, or auction account and depositing the payment into the seller's credit card, bank account, or auction account. A sale may take place due to one of two types of events. The first event is when the buyer actually enters a bid equal to the posted price. The second event is when a seller at some point in time decides to accept a short-bid. This also triggers the Sale Executor 108 to perform the sale transaction. Embodiments with an Email Notifier 112 will send email to buyers and sellers when the sale transaction is completed.

Embodiments may provide infrastructure and user interface screens for allowing sellers and buyers to rate each other for their transactions once they complete (see 302, 405, 505). Such ratings must be stored in the auction database and be available for subsequent bidder or seller filtering. In particular, some sellers may want to sell or not sell to specific bidders based on their rating even when they submit an attractively high short-bid. Various approaches for transaction rating management are well-known to those skilled in the art.

One embodiment of the present invention comprises the ability to sell electronic goods. Embodiments may provide selling of electronic goods where sellers manage the electronic good download at a separate external site 210, or may provide an Electronic Goods Manager 601 as depicted in the extended internal subsystems diagram of FIG. 6. The Electronic Goods Manager 601 stores and retrieves electronic goods when the seller desires that the auction site manage the electronic good (211 and 212). Embodiments providing site management of electronic goods will store them in the Electronic Goods Database 602, also pictured in FIG. 6.

Embodiments of the present invention supporting electronically downloadable goods can include an URL in completed sales transaction email notifications so that the buyer can click on it to download the good. Such embodiments may incorporate security methods and apparatus to guarantee that only the specific buyer can access the download. Secure approaches include unique download IDs in the URL, requiring the use to login again with the unique downioad ID, and providing the downloadable electronic good for only a limited time. Various secure approaches may be employed and are familiar to those skilled in the art.

One embodiment of the present invention comprises a Bid Reviewer user interface screen 400 as shown in FIG. 4 that provides a seller of an auction the means to review any or all bids 405. Such embodiments provide methods and apparatus for filtering 402 and/or sorting 403 bids on an auction item. While FIG. 4 depicts simple editboxes for entering a filter 402 and sort expression 403, more elaborate embodiments may provide user friendly approaches comprising buttons or combobox lists with expressions, operators, and salient fields to search and sort on. Various approaches for user friendly filter and sort expression construction are well-known to those skilled in the art.

One embodiment of the present invention provides the seller an "update review list" pushbutton 404, as shown in FIG. 4, which is depressed once filter and/or sort expressions are set, wherein the list of bids satisfying the search expressions will be displayed on the right. Most embodiments should allow only past or current bids to be searchable. However, more sophisticated embodiments may provide search on inactive future bids depending on the privacy policy of the auction site with respect to a seller having access to a bidder's future plans. Most sellers will employ the Bid Reviewer user interface screen 400 to examine some or all short-bids as depicted on the right 405 of FIG. 4. As such, embodiments of the present invention will tend to incorporate the checkboxes 405 next to the bids and a "Sell" pushbutton 406 so that the seller can decide which short-bids to accept and executes sales transactions immediately. While FIG. 4 depicts specific information about each bid, different embodiments may choose to display any, all, or more information about each bid. Note that FIG. 4 also shows that more information about a bid may be displayed when a specific bid is selected (407 and 408). Those skilled in the art will realize that many approaches for the organization and presentation of bid information is available.

One embodiment of the present invention provides methods and apparatus for using the Email Notifier 112 to send updated short-bid reports periodically or when a new bid is submitted. Such embodiments may provide an additional short-bid review reports notification configuration user interface screen in order to establish the frequency and/or the configuration of the report.

More sophisticated embodiments of the present invention may choose to provide method and apparatus for customizing what information is displayed in the "Review Bids" list.

One embodiment of the present invention comprises a Bid Analyzer user interface screen 500 as shown in FIG. 5 that provides a seller of an auction the means to analyze any or all bids 505. As with the Bid Reviewer user interface screen 400, such embodiments provide methods and apparatus for filtering 502 and/or sorting bids 503 on an auction item. While FIG. 5 depicts simple editboxes for entering a filter 502 and sort expression 503, more elaborate embodiments may provide user friendly approaches comprising buttons or combobox lists with expressions, operators, and salient fields to search and sort on. Various approaches for user friendly filter and sort expression construction are well-known to those skilled in the art.

One embodiment of the present invention provides the seller an "update analysis" pushbutton 504, as shown in FIG. 5, which is depressed once filter and/or sort expressions are set, wherein the list of bids satisfying the search expressions will be displayed on the right 505 and an analysis of revenue will be displayed on the bottom (506 and 507). While FIG. 5 depicts an embodiment that displays a list box of bids 506 with their quantities and project revenue along with a bar chart of revenue 507, other embodiments of the present invention may decide to provide analysis of a different measure, provide the ability to select one of several measures, and/or decide to provide totally different lists, graphs, and visuals for enhancing analysis.

One embodiment of the present invention links the Bid Analyzer user interface screen 500 to the Bid Reviewer screen 400 so that sales may be executed immediately after analysis.

One embodiment of the present invention combines the Bid Reviewer and Bid Analyzer into one user interface screen.

Those skilled in the art will recognize that the foregoing description has been presented for the sake of illustration and description only. As such, it is not intended to be exhaustive or to limit the invention to the precise form disclosed.

What is claimed is:

1. A method for electronically managing auctions at auction websites over the internet that include short-bidding, the method comprising:

at an auction website, creating an auction, which includes entering information about an item, setting a quantity for the item, and setting an asking price for the item, where the auction creating is performed via a seller user interface by a single seller at a first client computer;

placing a bid on the item, including setting a bid price, where the bid price may be any price regardless of the asking price for the item and regardless of any bid prices on other bids, if any, for the item, where the bid becomes a short-bid contract when the bid price is less than the asking price, and where the bid is placed via a bid creator user interface by any one of a potential number of purchasing bidders at a second client computer;

providing the seller with information on the short-bid contracts, if any, for the item, and receiving from the seller an indication of whether to accept any particular short-bid contract, where the providing and receiving are performed by the seller via a bid review user interface at the first client computer; and at the auction website, executing a short-bid sale of the item in a particular short-bid contract upon receipt of the acceptance indication for the particular short-bid contract.

2. A medium readable by a computer containing instructions that when performed by the computer provide a method for electronically managing auctions that include short-bidding, the method comprising:

creating an auction, which includes entering information about an item, setting a quantity for the item, and setting an asking price for the item, where the auction creating is performed via a seller user interface by a single seller;

placing a bid on the item, including setting a bid price, where the bit price may be any price regardless of the asking price for the item and regardless of any bid prices on other bids, if any, for the item, where the bid becomes a short-bid contract when the bid price is less than the asking price, and where the bid is placed via a bid creator user interface by any one of a potential number of purchasing bidders;

providing the seller with information on the short-bid contracts, if any, for the item, and receiving from the seller an indication of whether to accept any particular short-bid contract, where the providing and receiving are performed by the seller via a bid review user interface; and executing a short-bid sale of the item in a particular short-bid contract upon receipt of the acceptance indication for the particular short-bid contract.

3. A system for electronically managing auctions that include short-bidding, the system comprising:

a memory device to store sets of instructions; and at least one possessor coupled with the memory device to execute the set of instructions, wherein the sets of instructions cause the at least one processor to:

implement an auction creator user interface configured to allow a single seller to create an auction by entering information about an item, by setting a quantity for the item, and by setting an asking price for the item;

implement a bid creator user interface configured to allow each one of a plurality of purchasing bidders to place a bid on the item, and to set a bid price regardless of the asking price for the item and regardless of any bid prices on other bids for the item, and where when the bid price is less than the asking price then the bid becomes a short-bid contract;

implement a bid reviewer user interface configured to provide the seller with information on the short-bid contracts, if any, for the item, and to receive from the seller an indication of whether to accept any particular short-bid contract; and implement a sale executor configured to execute a short-bid sale on the item in the particular short-bid contract when the bid reviewer receives the acceptance indication for a particular short-bid contract.

4. The system of claim 3, further comprising a bid manager configured to execute an asking price sale on the item when the bid price of any of the bids is at the asking price for the item.

5. The system of claim 4, further comprising an auction editor configured to allow the seller to modify the auction so that the asking price is lowered, and the bid manager sells the item to all short-bids that are now equal to or greater than the modified asking price.

6. The system of claim 3, where the auction creator further provides for sellers to create an auction in which the auction for a specific good lasts only for a specified time interval.

7. The system of claim 3 further comprising a notification manager that sends notification to the seller when one of the bids is created.

8. The system of claim 3, where the auction creator further provides for sellers to create an auction in which the auction runs until a last one of the items is sold or the seller terminates the auction.

9. The system of claim 3, further comprising a bid reviewer configured to allow the seller to review a history of the bids and the sales using a technique selected from a display filter, a sorting criteria, or both a display filter and a sorting criteria.

10. The system of claim 9, where the display filter is configured to allow the seller to select and deselect individual ones of the purchasing bidders.

11. The system of claim 9, where:
the bid creator further allows any of the purchasing bidders to specify what the bid price will be during each of a specific time period of the auction
the bid reviewer is further configured to provide information selected from one or more of:
i) the active bids;
ii) the expired bids; or
iii) the bids with prices specified for the time periods of the auction.

12. The system of claim 3, comprising a bid analyzer to provide information on how much revenue will be made on all transactions assuming acceptance of a selected one or more of the bids.

13. The system of claim 3, where the bid creator further allows any of the purchasing bidders to specify what the bid price will be during each of a specific time period of the auction.

14. The system of claim 3, further comprising an auction creator for sellers to create an auction on a specific downloadable electronic good with an infinite quantity.

* * * * *